Figure 5:
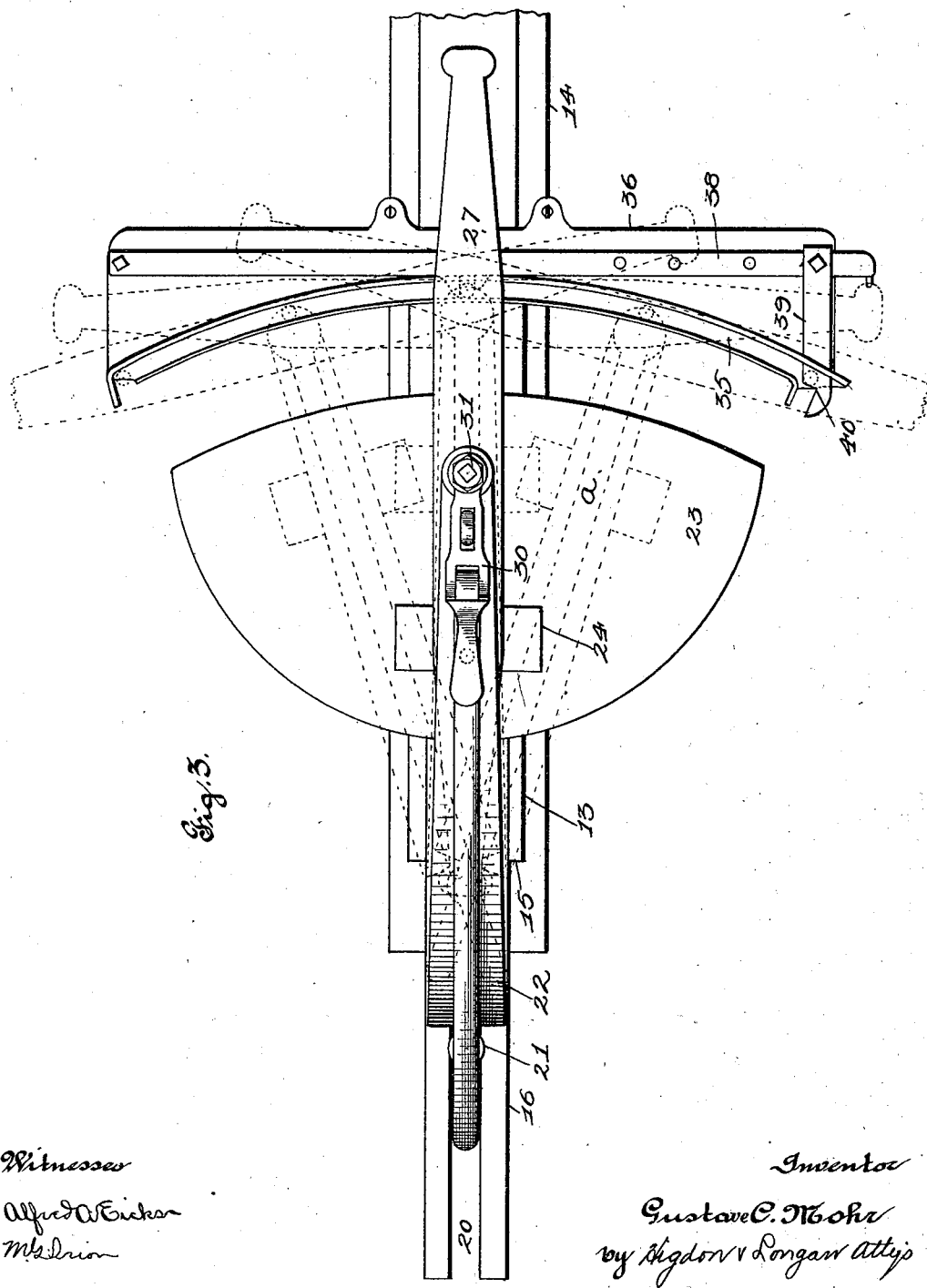

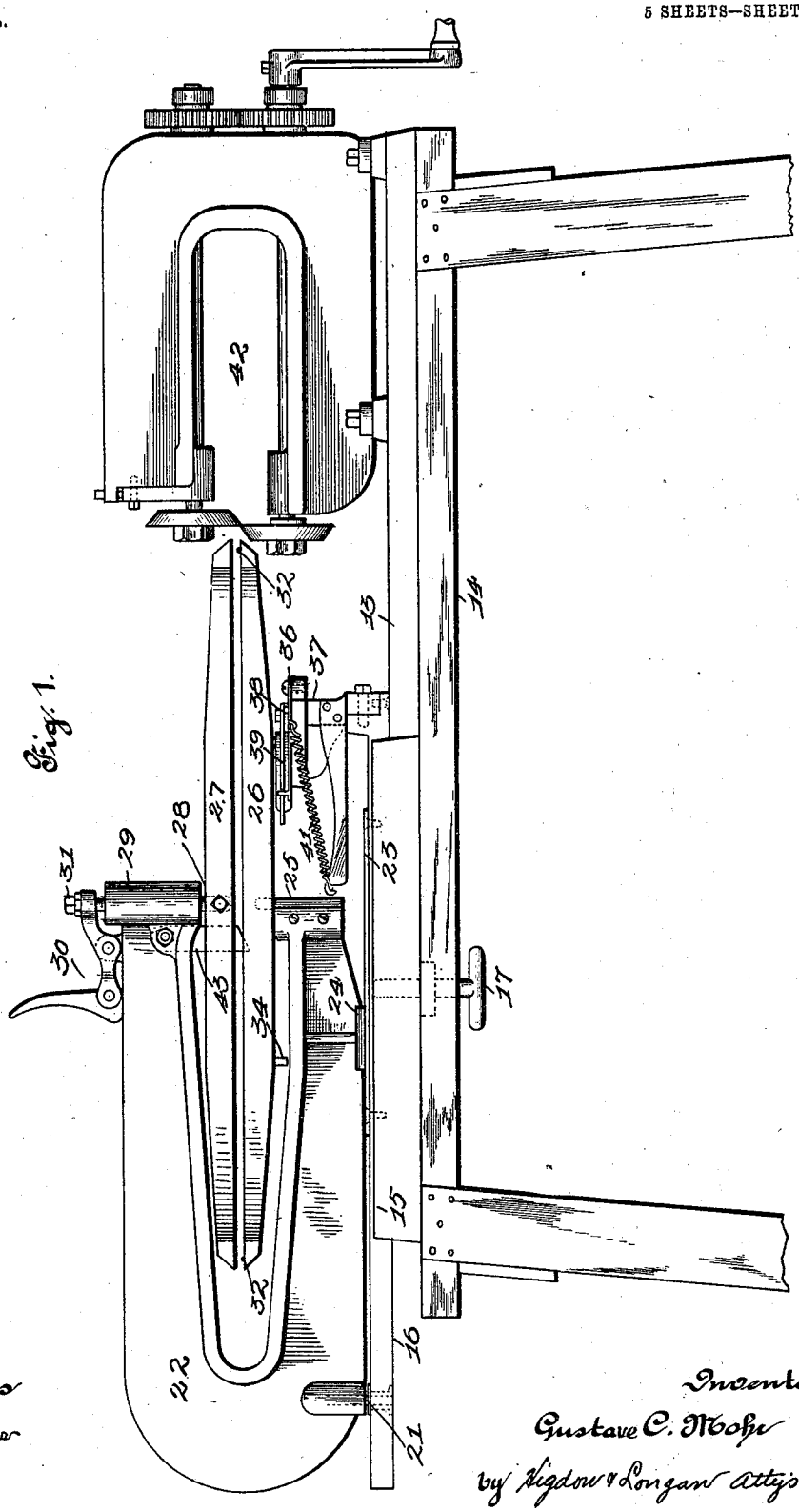

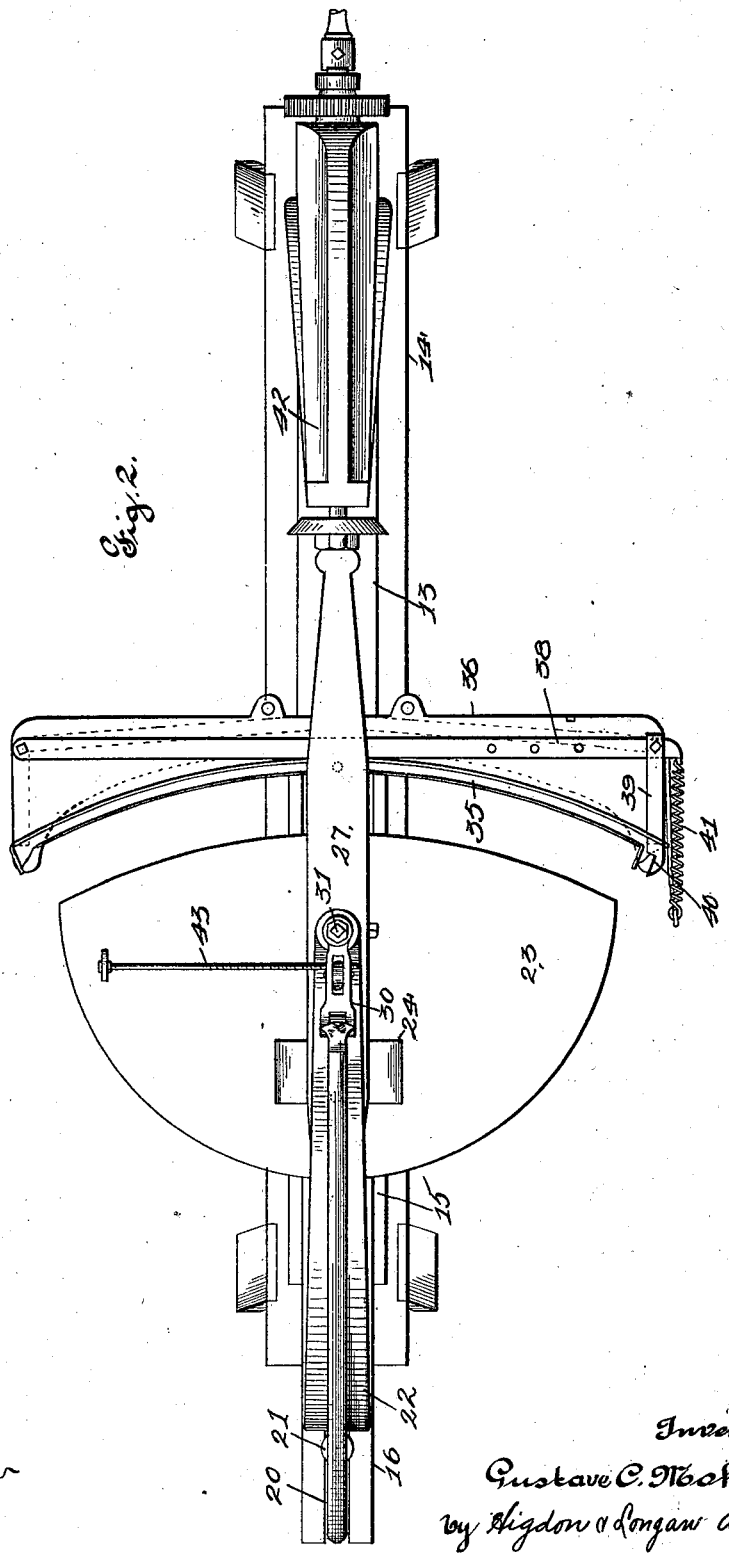

No. 723,703. PATENTED MAR. 24, 1903.
G. C. MOHR.
SHEET METAL CUTTING AND SHAPING MACHINE.
APPLICATION FILED NOV. 3, 1902.
NO MODEL. 5 SHEETS—SHEET 3.

Witnesses
Inventor
Gustave C. Mohr

No. 723,703. PATENTED MAR. 24, 1903.
G. C. MOHR.
SHEET METAL CUTTING AND SHAPING MACHINE.
APPLICATION FILED NOV. 3, 1902.
NO MODEL. 5 SHEETS—SHEET 4.
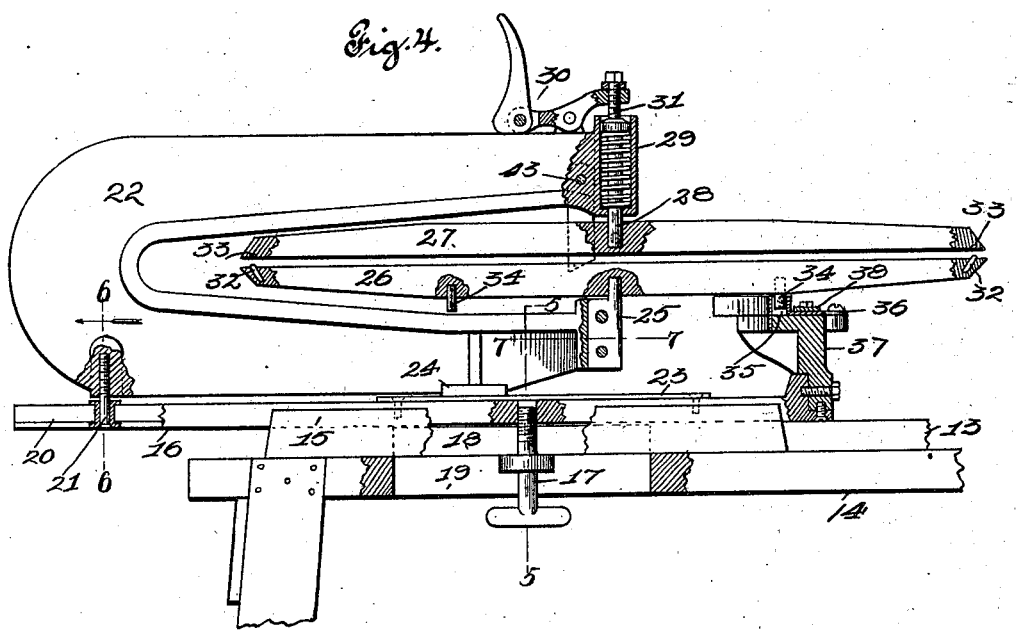
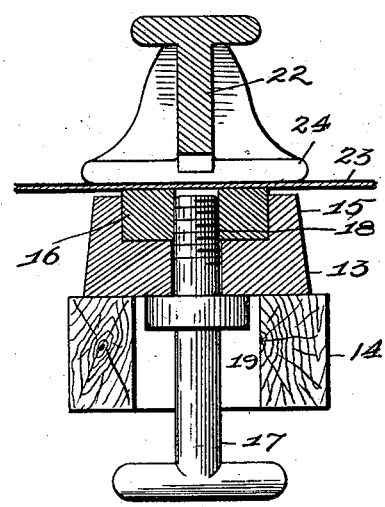
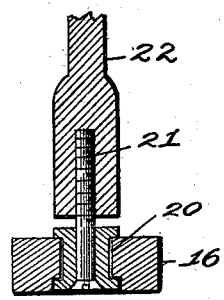
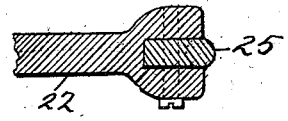
Witnesses
Alfred W Ericker
Mt Drion
Inventor
Gustave C. Mohr
by Higdon & Longan attys No. 723,703. PATENTED MAR. 24, 1903.
G. C. MOHR.
SHEET METAL CUTTING AND SHAPING MACHINE.
APPLICATION FILED NOV. 3, 1902.
NO MODEL. 5 SHEETS—SHEET 5.
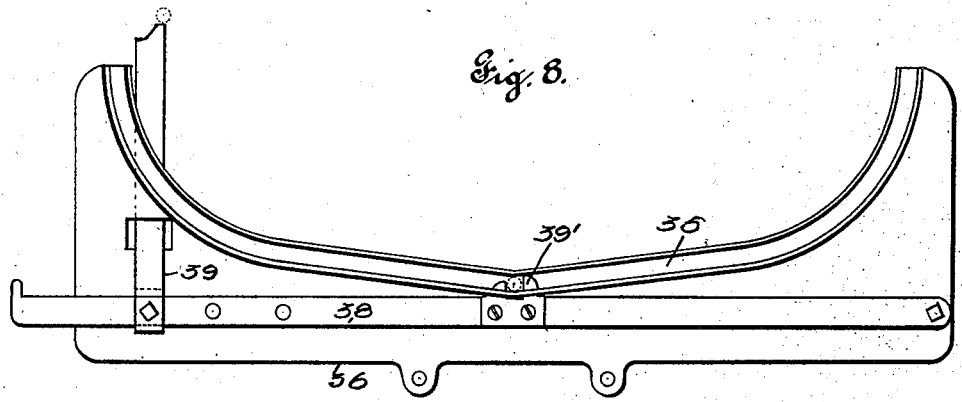
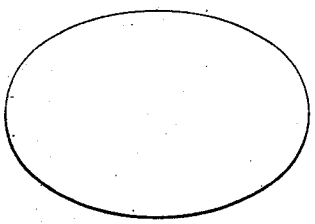
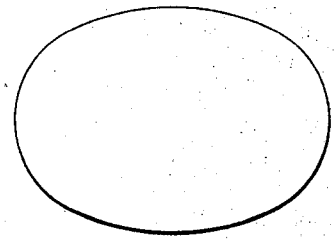
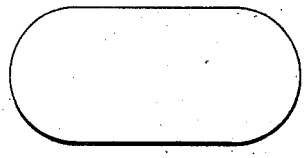
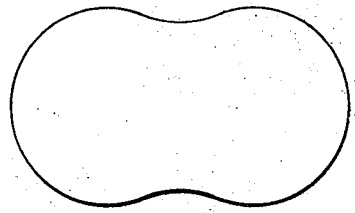
Witnesses
Alfred W Ticker
M. G. Orion
Inventor
Gustave C. Mohr
by Higdon & Longan atty's

UNITED STATES PATENT OFFICE.

GUSTAVE C. MOHR, OF ST. LOUIS, MISSOURI, ASSIGNOR TO HEMP AND COMPANY, OF ST. LOUIS, MISSOURI, A CORPORATION OF MISSOURI.

SHEET-METAL CUTTING AND SHAPING MACHINE.

SPECIFICATION forming part of Letters Patent No. 723,703, dated March 24, 1903.

Application filed November 3, 1902. Serial No. 129,988. (No model.)

*To all whom it may concern:*

Be it known that I, GUSTAVE C. MOHR, of the city of St. Louis, State of Missouri, have invented certain new and useful Improvements in Sheet-Metal Cutting and Shaping Machines, of which the following is a full, clear, and exact description, reference being had to the accompanying drawings, forming a part hereof.

This invention relates to improvements in a sheet-metal cutting and shaping machine; and it consists of the novel construction, combination, and arrangement of parts hereinafter shown, described, and claimed.

The object of this invention is to construct a machine whereby sheet metal may be cut into plates of various shapes.

Figure 1 is a side elevation of my complete invention. Fig. 2 is a top plan view of the same. Fig. 3 is a top plan view of the turning and clamping device, the different positions to which it may be adjusted being shown in dotted lines. Fig. 4 is a side elevation of the same with parts in section, showing the construction. Fig. 5 is a cross-sectional view taken on the line 5 5 of Fig. 4. Fig. 6 is a cross-sectional view taken on the line 6 6 of Fig. 4. Fig. 7 is a detail horizontal sectional view taken on the line 7 7 of Fig. 4. Fig. 8 is a detail plan view of a modified form of guide used for shaping the plates. Figs. 9, 10, 11, and 12 are views of the various-shaped plates cut by my invention.

In the construction of the device as shown I provide a base or support 13, which is suitably mounted upon a trestle 14. A portion of the base 13 is provided with flanges 15, forming a suitable guideway wherein the set-bar 16 is adjusted and rigidly held at its adjustment by the set-screw 17. The base 13 and the trestle 14 are provided with suitable slots 18 and 19 for the movement of the set-screw longitudinally. The set-bar 16 is provided with a slot 20, in which is guided the pivot-post 21 of the supporting-yoke 22. Upon the set-bar is located a supporting-plate 23, upon which one end of the yoke 22 is supported, said plate being of sufficient size to allow for the circular motion imparted to the yoke by the action of the guide hereinafter fully described. The yoke is held in a vertical position by means of the shoe 24. The lower arm of the yoke 22 is provided with a removable pivot 25, upon which is mounted a clamping-jaw 26. A corresponding jaw 27 is pivoted to a spring-actuated bolt 28, held in a socket 29, formed on the upper end of the yoke. The upper jaw 27 is raised and lowered by means of the locking-lever 30, located upon the top of the yoke, (causing the set-screw 31 to come in contact with the spring-actuated bolt 28,) and is released in a reverse manner. The ends of the jaw 26 are provided with a tooth 32 and are received by the notches 33, formed in the ends of the upper jaw. This is for the purpose of firmly clamping the sheet of metal and preventing lateral motion. The lower jaw is also provided with trunnions 34, located equidistant from the center pivot 25 and are to pass through the groove 35, formed on the guide-plate 36, which is suitably mounted upon a frame 37 and carried by the set-bar. Upon the guide-plate is fulcrumed a lever 38, having at its center projecting teeth 39' and extending into the slot for alternately stopping and supporting the trunnion 34. The free end of the lever 38 is provided with an arm 39, its end being provided with a recess 40, the said arm 39 projecting into the groove 35 at its entrance. The lever 38 and arm 39 are normally held in a locked position by the coil-spring 41.

The sheet metal is cut by the ordinary rotary shears 42, which are mounted upon one end of the base 13.

The operation of my invention is as follows: The jaws are first placed in position, as shown in Fig. 2, in alinement with the rotary cutting-shears, the one trunnion of the lower jaw being placed in the slot between the teeth 39' of the lever 38. The sheet metal is then placed between the jaws and is located centrally by means of the gage 43. The device is then adjusted according to the size of sheet to be cut by manipulation of the set-screw 17. The rotary shears are then operated, and by cutting the sheet metal it will automatically feed itself and will cause the jaws and yoke to follow in the position as shown by dotted lines *a* in Fig. 3 until the opposite trunnion of the lower jaw comes in contact with the recess 40 of the arm 39, pressing the lever 38 outwardly, releasing the central trunnion, and both trunnions are allowed to pass through the groove of the guide-plate until the following trunnion reaches center, that is automatically locked and held in position by the teeth 39'. The trunnion previously released from the teeth will then pass out of the opposite end of the groove and will form a complete arc of a circle by means of the trunnion acting as a stationary pivot. Throughout the operation the sheet of metal is turned upon two pivots, the trunnions of the clamping-jaws serving as pivots alternately while the semicircular ends of the sheet are cut, the groove itself governing the form of the intermediate portions of the shape. By referring to Fig. 3 it will be observed that the various positions the device assumes are indicated by dotted lines.

By substituting differently-shaped guide-plates and other jaws with trunnions differently located various shapes may be cut. For example, a few of the different-shaped plates are shown in Figs. 9, 10, 11, and 12. By the guide-plate shown in Figs. 2 and 3 a plate as shown in Fig. 10 is cut, and by the guide-plate shown in Fig. 8 a plate as shown in Fig. 9 is cut. By varying the shape of the groove a perfect oval or ellipse can be cut, which is preferably designed for wood-stoves, minnow-buckets, and the like.

By removing the frame 37 and bolting the shoe to the set-bar the machine becomes an efficient circle-cutter.

I claim—

1. A machine for cutting and shaping sheet metal, comprising a pair of rotary shears; clamping-jaws pivotally carried by a yoke; trunnions carried by said jaws; and a guide-plate for receiving the trunnions and guiding the jaws and sheet metal while cutting, substantially as specified.

2. A device of the class described, comprising a set-bar adjustably mounted within a base; a yoke pivotally and slidingly mounted upon said set-bar; clamping-jaws pivotally carried by said yoke; a guide-plate carried by the set-bar; trunnions formed on one of said jaws and adapted to operate upon said guide-plate; and means for retaining and releasing said trunnions to permit the rotation of the clamps and sheet metal while cutting, substantially as specified.

3. A device of the class described, comprising a set-bar adjustably mounted within a base; a yoke pivotally and slidingly mounted upon said set-bar; clamping-jaws pivotally carried by said yoke; means for opening and closing said jaws; a guide-plate carried by said set-bar; trunnions carried by one of said jaws and adapted to pass within the groove of the guide-plate; and a toothed lever carried by said guide-plate and arranged to hold one of said trunnions while acting as a pivot, and to release said trunnion by the action of the second trunnion, said retaining and releasing mechanism being operated automatically during the cutting of the material, substantially as specified.

4. A device of the class described, comprising a pair of jaws pivotally mounted within a frame; trunnions carried by one of said jaws, said trunnions at times acting as pivots, and while in their travel serving to shape the material into the required design; and means for automatically retaining and releasing said trunnions, substantially as specified.

In testimony whereof I affix my signature in presence of two witnesses.

GUSTAVE C. MOHR.

Witnesses:
M. G. IRION,
ALFRED A. EICKS.